United States Patent [19]

Owen

[11] Patent Number: 5,126,036

[45] Date of Patent: Jun. 30, 1992

[54] PROCESS AND APPARATUS FOR SPLIT FEED OF SPENT CATALYST TO HIGH EFFICIENCY CATALYST REGENERATOR

[75] Inventor: Hartley Owen, Belle Mead, N.J.

[73] Assignee: Mobil Oil Corporation, Fairfax, Va.

[21] Appl. No.: 788,060

[22] Filed: Nov. 5, 1991

[51] Int. Cl.⁵ .......................................... C10G 11/00
[52] U.S. Cl. ................................. 208/113; 208/121;
    208/147; 208/155; 208/156; 208/157; 208/161;
    502/43; 422/144; 422/145; 422/147
[58] Field of Search ............... 208/113, 121, 147, 155,
    208/156, 157, 161; 502/42, 43; 422/143, 144,
    145, 147

Primary Examiner—Theodore Morris
Assistant Examiner—William C. Diemler
Attorney, Agent, or Firm—Alexander J. McKillop; Charles J. Speciale; Richard D. Stone

[57] ABSTRACT

A process and apparatus for regeneration of coked catalyst used in the fluidized cracking of heavy oils is disclosed. A high efficiency catalyst regenerator, with a fast fluidized bed coke combustor, dilute phase transport riser, and second fluidized bed is used but modified so that at least some coked catalyst is added directly to the second fluidized bed. The coked catalyst can be heated by direct contact heat exchange in the second fluidized bed and then charged to the coke combustor, or the coked catalyst can be regenerated in the second fluidized bed, or some combination of both. Adding catalyst to the second fluidized bed increases the coke burning capacity of these regenerators, and/or permits a drier regeneration.

20 Claims, 2 Drawing Sheets

PROCESS AND APPARATUS FOR SPLIT FEED OF SPENT CATALYST TO HIGH EFFICIENCY CATALYST REGENERATOR

BACKGROUND OF THE INVENTION

1. FIELD OF THE INVENTION

The field of the invention is regeneration of coked cracking catalyst in a fluidized bed.

2. DESCRIPTION OF RELATED ART

Catalytic cracking is the backbone of many refineries. It converts heavy feeds into lighter products by catalytically cracking large molecules into smaller molecules. Catalytic cracking operates at low pressures, without hydrogen addition, in contrast to hydrocracking, which operates at high hydrogen partial pressures. Catalytic cracking is inherently safe as it operates with very little oil actually in inventory during the cracking process.

There are two main variants of the catalytic cracking process: moving bed and the far more popular and efficient fluidized bed process.

In the fluidized catalytic cracking (FCC) process, catalyst, having a particle size and color resembling table salt and pepper, circulates between a cracking reactor and a catalyst regenerator. In the reactor, hydrocarbon feed contacts a source of hot, regenerated catalyst. The hot catalyst vaporizes and cracks the feed at 425°-600°, usually 460° C.-560° C. The cracking reaction deposits carbonaceous hydrocarbons or coke on the catalyst, thereby deactivating the catalyst. The cracked products are separated from the coked catalyst. The coked catalyst is stripped of volatiles, usually with steam, in a catalyst stripper and the stripped catalyst is then regenerated. The catalyst regenerator burns coke from the catalyst with oxygen containing gas, usually air. Decoking restores catalyst activity and simultaneously heats the catalyst to, e.g., 500° C.-900° C., usually 600° C.-750° C. This heated catalyst is recycled to the cracking reactor to crack more fresh feed. Flue gas formed by burning coke in the regenerator may be treated for removal of particulates and for conversion of carbon monoxide, after which the flue gas is normally discharged into the atmosphere.

Catalytic cracking is endothermic, it consumes heat. The heat for cracking is supplied at first by the hot regenerated catalyst from the regenerator. Ultimately, it is the feed which supplies the heat needed to crack the feed. Some of the feed deposits as coke on the catalyst, and the burning of this coke generates heat in the regenerator, which is recycled to the reactor in the form of hot catalyst.

Catalytic cracking has undergone progressive development since the 40s. The trend of development of the fluid catalytic cracking (FCC) process has been to all riser cracking and use of zeolite catalysts.

Riser cracking gives higher yields of valuable products than dense bed cracking. Most FCC units now use all riser cracking, with hydrocarbon residence times in the riser of less than 10 seconds, and even less than 5 seconds, and in some cases less than 1 second.

Zeolite-containing catalysts having high activity and selectivity are now used in most FCC units. These catalysts work best when coke on the catalyst after regeneration is less than 0.1 wt %, and preferably less than 0.05 wt %.

To regenerate FCC catalysts to these low residual carbon levels, and to burn CO completely to $CO_2$ within the regenerator (to conserve heat and minimize air pollution) many FCC operators have turned to high efficiency regenerators and to CO combustion promoters.

High efficiency regenerators were a breakthrough in catalyst regeneration in FCC. Rather than rely on a large, single dense phase, bubbling fluidized bed, catalyst regeneration was conducted in a new device containing a fast fluidized bed, a dilute phase transport riser, and a second dense bed.

In the fast fluidized bed, sometimes called a coke combustor, stripped catalyst, usually along with some recycled, hot, regenerated catalyst, was substantially decoked by contact with air. Superficial vapor velocities in the coke combustor were high, usually near the upper limit of velocity where a dense phase fluidized bed could be maintained. The coke combustor operated without large bubbles, which had plagued the operation of the large, single dense bed regenerators previously used.

The dilute phase transport riser was above the coke combustor. A gradual reduction in cross sectional area of a transition section between the coke combustor and the transport riser increased the vapor velocity, and led to a dilute phase regime in the upper portion of the coke combustor and in the transport riser. CO combustion to $CO_2$ proceeded rapidly in the dilute phase.

The second dense bed served to collect regenerated catalyst discharged from the transport riser. The collected regenerated catalyst was recycled to the cracking reactor, and usually a large amount was recycled to the coke combustor to heat the incoming stripped catalyst and promote rapid coke combustion in the coke combustor, and CO combustion in the transport riser.

Most FCC operators, with both the old and the new or high efficiency regenerators, added a CO combustion promoter.

U.S. Pat. Nos. 4,072,600 and 4,093,535, which are incorporated by reference, teach use of combustion-promoting metals such as Pt, Pd, Ir, Rh, Os, Ru and Re in cracking catalysts in concentrations of 0.01 to 50 ppm, based on total catalyst inventory.

As the process and catalyst improved, refiners attempted to use the process to upgrade a wider range of feedstocks, in particular, feedstocks that were heavier, and also contained more metals and sulfur than had previously been permitted in the feed to a fluid catalytic cracking unit.

These heavier, dirtier feeds have placed a growing demand on the regenerator. Processing resids has exacerbated many existing problem areas in the regenerator, and caused the coke burning capacity of the regenerator to be the limiting factor in some FCC units.

With heavier feeds, more coke is often deposited on the catalyst than is needed for the cracking reaction. The regenerator gets hotter, and the extra heat is rejected as high temperature flue gas. Many refiners severely limit the amount of resid or similar high CCR feeds to that amount which can be tolerated by the unit. High temperatures are a problem for the metallurgy of many units, but more importantly, are a problem for the catalyst. In the regenerator, the burning of coke and unstripped hydrocarbons leads to much higher surface temperatures on the catalyst than the measured dense bed or dilute phase temperature. This is discussed by Occelli et al in Dual-Functi Cracking Catalyst Mixtures, Ch. 12, Fluid Catalytic Cracking. Symposium Series 375, American Chemical Society, Washington, D.C., 1988.

Some regenerator temperature control is possible by adjusting the $CO/CO_2$ ratio produced in the regenerator. Burning coke partially to CO produces less heat than complete combustion to $CO_2$. However, in some cases, this control is insufficient, and also leads to increased CO emissions, which can be a problem unless a CO boiler is present.

U.S. Pat. No. 4,353,812 to Lomas et al, which is incorporated by reference, discloses cooling catalyst from a regenerator by passing it through the shell side of a heat-exchanger with a cooling medium through the tube side. The cooled catalyst is recycled to the regeneration zone. This approach will remove heat from the regenerator, but will not prevent poorly, or even well, stripped catalyst from experiencing very high surface or localized temperatures in the regenerator.

The prior art also used dense or dilute phase regenerated fluid catalyst heat removal zones or heat-exchangers that are remote from, and external to, the regenerator vessel to cool hot regenerated catalyst for return to the regenerator. Examples of such processes are found in U.S. Pat. Nos. 2,970,117 to Harper; 2,873,175 to Owens; 2,862,798 to McKinney; 2,596,748 to Watson et al; 2,515,156 to Jahnig et al; 2,492,948 to Berger; and 2,506,123 to Watson.

Although catalyst coolers, or limiting operation to partial CO combustion will help some, these methods alone will not get around that fact that the coke burning capacity of many high efficiency regenerators is finite. Even putting in more air blowers, and putting myriad catalyst coolers around the regenerator, will not bypass the somewhat limited coke burning capacity of the coke combustor.

I have found a way to significantly increase the coke burning capacity of high efficiency FCC catalyst regenerators. My method can also be used to achieve somewhat cleaner catalyst in these regenerators. I realized that these regenerators suffered from an oversight, namely that much of the regenerator sat idle and performed little or no useful work. I realized that a significant increase in coke burning capacity could be achieved by using a heretofore neglected approach to catalyst regeneration in these units, specifically, adding some of the spent catalyst to be regenerated to the second dense bed, instead of adding all the spent catalyst to the coke combustor. By using a conventional high efficiency regenerator in an unconventional way, and by-passing the coke combustor, I can increase the coke burning capacity of these units by preheating some of the stripped catalyst in the second dense bed, by regenerating some of the stripped catalyst in the second dense bed, or both.

BRIEF SUMMARY OF THE INVENTION

Accordingly, the present invention provides in a fluidized catalytic cracking process for catalytic cracking of a heavy hydrocarbon feed to lighter products by contact of the heavy feed with a source of hot, regenerated catalytic cracking catalyst to produce cracked products and spent catalyst containing coke, and wherein the spent catalyst is stripped, and the stripped, spent catalyst is regenerated by contact with oxygen or an oxygen containing gas at catalyst regeneration conditions in a high efficiency regenerator comprising a coke combustor having a dense bed of catalyst, a dilute phase transport riser mounted above the coke combustor, and a second fluidized bed of regenerated catalyst, and wherein the stripped catalyst is split into a first and second stream, the first stream is charged to the coke combustor and the second stream is charged directly to the second fluidized bed without passage through the coke combustor or dilute phase transport riser."

In another embodiment, the present invention provides a fluidized catalytic cracking process wherein a heavy hydrocarbon feed comprising hydrocarbons having a boiling point above about 650° F. is catalytically cracked to lighter products comprising: catalytically cracking the feed in a catalytic cracking zone operating at catalytic cracking conditions by contacting the feed with a source of hot regenerated catalyst to produce a cracking zone effluent mixture having an effluent temperature and comprising cracked products and spent cracking catalyst containing coke comprising carbon, hydrogen and strippable hydrocarbons; separating the cracking zone effluent mixture into a cracked product rich vapor phase and a solids rich phase having a temperature and comprising the spent catalyst and strippable hydrocarbons; stripping the spent catalyst with a stripping gas to remove strippable and produce stripped catalyst; separating the stripped catalyst into at least two streams comprising a primary stripped catalyst stream comprising at least a majority of the stripped catalyst and a secondary stripped catalyst stream; regenerating the primary stripped catalyst stream by contact with oxygen or an oxygen containing gas at catalyst regeneration conditions in a high efficiency catalyst regeneration means comprising, in series, a fast fluidized bed coke combustor, a superimposed dilute phase transport riser, and a second fluidized bed at an elevation above said coke combustor; regenerating the secondary stripped catalyst stream by charging it to the base of a vertical lift pipe, at least a portion of which is parallel to but isolated from said transport riser, and adding a lift fluidizing medium comprising oxygen or an oxygen containing gas to the base of the lift pipe and lifting said secondary stripped catalyst directly to the second fluidized bed via said lift pipe; recycling to the catalytic cracking process hot regenerated catalyst from said second fluidized bed.

In an apparatus embodiment, the present invention provides an apparatus for the fluidized catalytic cracking of a heavy hydrocarbon feed comprising hydrocarbons having a boiling point above about 650° F. to lighter products by contact said feed with catalytic cracking catalyst comprising a catalytic cracking reactor means having an inlet connective with a source of said feed and with a source of hot regenerated catalyst and having an outlet for discharging a cracking zone effluent mixture comprising cracked products and spent cracking catalyst containing coke and strippable hydrocarbons; a separation means connective with said reactor outlet for separating said cracking zone effluent mixture into a cracked product rich vapor phase and a solids rich phase comprising said spent catalyst and strippable hydrocarbons; a stripping means comprising an inlet for spent catalyst, an inlet for a stripping gas, a stripping vapor outlet and a solids outlet for discharge of stripped solids; a stripped catalyst stream splitting means adapted to divide the stripped catalyst into a primary stream comprising a majority of the stripped catalyst and a secondary stream; a high efficiency catalyst regeneration means connective with the primary stream of stripped catalyst from the stream splitting means and comprising, in series, a coke combustor in a first vessel having an elevation, a vertical dilute phase transport riser, and a second fluidized bed in a second vessel at an elevation above said first vessel, and wherein said coke combustor means is adapted to maintain a fast fluidized bed of catalyst therein at fast fluidized bed catalyst regeneration conditions, and has an inlet for the primary stream of stripped catalyst, a primary regeneration gas inlet, an upper coke combustor outlet for discharge of at least partially regenerated catalyst and flue gas, said upper outlet being connective with and in vertical alignment with a dilute phase transport riser; said dilute phase transport riser means has an inlet at a base thereof connective with said upper outlet of said coke combustor and a transport riser outlet at an upper portion of said transport riser and within the second vessel; and said second vessel means has an inlet comprising said transport riser outlet, and said second vessel is adapted to contain at least the upper portion of said transport riser and to contain and maintain the second fluidized phase fluidized bed of catalyst in a lower portion of said second stage regeneration vessel; a secondary stripped catalyst stream transport means having an inlet connective with said stripped catalyst splitting means, an inlet for a lift gas, a vertical lift pipe, at least a portion of which is parallel to but isolated from said dilute phase transport riser, and a lift pipe outlet within said second vessel; and a catalyst recycle means connective with a portion of said second fluidized bed in said second vessel and adapted to recycle regenerated catalyst to said cracking reactor means.

DETAILED DESCRIPTION

Figure 1:
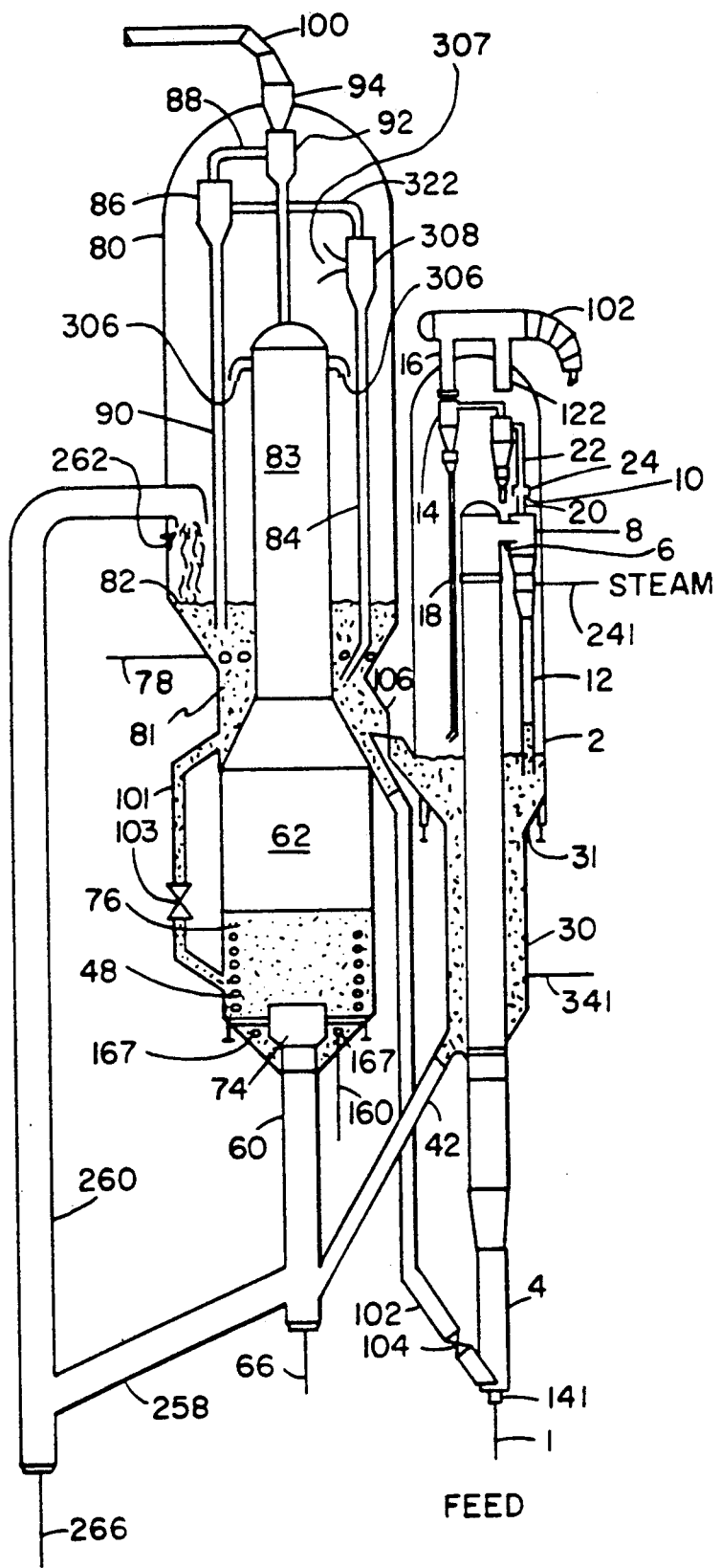
FIG. 1 is a schematic view of a high efficiency FCC catalyst regenerator which has been modified to permit split flow of spent catalyst to the regenerator.

The present invention can be better understood by reviewing it in conjunction with FIG. 1, which shows an FCC unit with a high efficiency regenerator incorporating split feed of spent catalyst to the regenerator. The present invention is applicable to many other types of high efficiency regenerators, such as those incorporating additional catalyst flue gas separation means in various parts of the regenerator, those with catalyst coolers associated with the regenerator (as in U.S. Pat. Nos. 4,757,039 or 4,820,404, which are incorporated herein by reference) and to regenerators with internal and external catalyst recycle (as shown in U.S. Pat. No. 4,033,726, which is incorporated herein by reference).

In the Figure, the riser reactor and the catalyst stripper per se form no part of the present invention. In the embodiment shown, a heavy feed is charged via line 1 to the lower end of a riser cracking FCC reactor 4. Hot regenerated catalyst is added via standpipe 102 and control valve 104 to mix with the feed. Preferably, some atomizing steam is added, via means not shown, to the base of the riser, usually with the feed. With heavier feeds, e.g., a resid, 1-10 wt. % steam may be used. A hydrocarbon-catalyst mixture rises as a generally dilute phase through riser 4. Cracked products and coked catalyst are discharged via riser effluent conduit 6 into cyclone 8 in vessel 2. The riser top temperature, the temperature in conduit 6, ranges between about 480° and 615° C. (900° and 1150° F.), and preferably between about 538° and 595° C. (1000° and 1050° F.). The riser top temperature is usually controlled by adjusting the catalyst to oil ratio in riser 4 or by varying feed preheat.

Cyclone 8 separates most of the catalyst from the cracked products and discharges this catalyst down via dipleg 12 to a stripping zone 30 located in a lower portion of vessel 2. Vapor and minor amounts of catalyst exit cyclone 8 via gas effluent conduit 20 and flow into connector 24, which allows for thermal expansion, and for the influx of stripper vapor from stripper 30, to conduit 22 which leads to a second stage reactor cyclone 14. The second cyclone 14 recovers some additional catalyst which is discharged via dipleg 18 to the stripping zone 30.

The second stage cyclone overhead stream, cracked products and catalyst fines, passes via effluent conduit 16 and line 120 to product fractionators not shown in the figure.

The coked catalyst discharged from the cyclone diplegs collects as a bed of catalyst 31 in the stripping zone 30. Dipleg 12 is sealed by being extended into the catalyst bed 31. Dipleg 18 is sealed by a trickle valve not shown.

Although only two cyclones 8 and 14 are shown, many cyclones, 4 to 8, are usually used in each cyclone separation stage. A preferred closed cyclone system is described in U.S. Pat. No. 4,502,947 to Haddad et al, which is incorporated by reference.

Stripper 30 is a "hot stripper." Hot stripping is preferred, but not essential. Spent catalyst is mixed in bed 31 with hot catalyst from the regenerator. Direct contact heat exchange heats spent catalyst. The regenerated catalyst, which has a temperature from 55° C. (100° F.) above the stripping zone 30 to 871° C. (1600° F.), heats spent catalyst in bed 31. Catalyst from regenerator 80 enters vessel 2 via transfer line 106, and a slide valve which controls catalyst flow. Adding hot, regenerated catalyst permits first stage stripping at from 55° C. (100° F.) above the riser reactor outlet temperature and 816° C. (1500° F.). Preferably, the first stage stripping zone operates at least 83° C. (150° F.) above the riser top temperature, but below 760° C. (1400° F.).

In bed 31 a stripping gas, preferably steam, flows countercurrent to the catalyst. The stripping ga is preferably introduced into the lower portion of bed 31 by one or more conduits 341. The stripping zone bed 31 preferably contains trays or baffles not shown. Stripping vapors enter the atmosphere of the vessel 2 and exit this vessel via outlet line 122 or by passing through the annular space 10 defined by outlet 20 and inlet 24.

High temperature stripping removes coke, sulfur and hydrogen from the spent catalyst. Coke is removed because carbon in the unstripped hydrocarbons is burned as coke in the regenerator. The sulfur is removed as hydrogen sulfide and mercaptans. The hydrogen is removed as molecular hydrogen, hydrocarbons, and hydrogen sulfide. Hot stripping increases the recovery of valuable liquid products, because the stripper vapors can be sent to product recovery with the bulk of the cracked products from the riser reactor. High temperature stripping can reduce coke load to the regenerator by 30 to 50% or more and remove 50-80% of the hydrogen as molecular hydrogen, light hydrocarbons and other hydrogen-containing compounds, and remove 35 to 55% of the sulfur as hydrogen sulfide and mercaptans, as well as a portion of nitrogen as ammonia and cyanides.

Although a hot stripping zone is shown in FIG. 1, the present invention is not, per se, the hot stripper. The process of the present invention may also be used with conventional strippers, or with long residence time steam strippers, or with strippers having internal or external heat exchange means.

Although not shown in FIG. 1, an internal or external catalyst stripper/cooler, with inlets for hot catalyst and fluidization gas, and outlets for cooled catalyst and stripper vapor, may also be used where desired to cool stripped catalyst before it enters the regenerator.

The stripped catalyst is split into at least two streams. Part of it is regenerated conventionally, in the coke combustor 62. Part of it is regenerated unconventionally, by being first added to the second dense bed of the regenerator. The conventional regeneration sequence will be discussed first.

Part, and preferably most, of the stripped catalyst is treated conventionally, and passes through the conduit 42 into regenerator riser 60. Air from line 66 and catalyst combine and pass up through an air catalyst disperser 74 and disperser arms 167 into coke combustor 62 in regenerator 80. In bed 62, combustible materials, such as coke on the catalyst, are burned by contact with air or oxygen containing gas.

The amount of air or oxygen containing gas added via line 66, to the base of the riser mixer 60, is preferably restricted to 40-90% of total air addition to the regenerator 80. The amount of air added can be constant, or can be controlled to achieve a predetermined amount of coke removal in the riser mixer, e.g., enough air could be added to achieve removal of 20% of the hydrogen on the catalyst, or to achieve a temperature increase in the riser of about 25° or 50° F. Control of air to the base of the riser mixer can be actively changed in response to delta T in the riser, or manually adjusted from time to time, based on temperature scans in the riser mixer.

Restricting the air addition slows down to some extent the rate of carbon burning in the riser mixer, and this minimizes the localized high temperature experienced by the catalyst in the regenerator. Limiting the air limits the burning and temperature rise experienced in the riser mixer, and limits the amount of catalyst deactivation that occurs there. It also ensures that most of the water of combustion, and resulting steam, will be formed at the lowest possible temperature.

Although not shown, it is possible to include in riser mixer 60 some recycled, hot regenerated catalyst. Recycle of hot, regenerated catalyst heats the spent catalyst and promotes faster coke combustion. I prefer not to do this, and do some of the coke burning at a relatively low temperature in transfer line 60. Catalyst recycle to the coke combustor via line 101 is preferred.

Additional air, preferably 5-50% of total air, may be added to the coke combustor via line 160 and air ring 167. In this way the first stage of regeneration in regenerator 80 can be done with as much air as desired. The first stage, roughly lumping the regeneration in the coke combustor and riser mixer, can achieve quite a lot of coke removal. Complete afterburning of CO to $CO_2$ is difficult to achieve in the coke combustor, and not necessary or desirable. Burning much of the poorly stripped hydrocarbons at relatively mild, even reducing conditions, in riser mixer 60 and to a lesser extent in coke combustor fast fluidized bed 76 minimizes NOx formation and minimizes steaming of the catalyst.

High temperatures promote rapid coke combustion, and CO afterburning. The temperature of fast fluidized bed 76 in the coke combustor 62 may be, and preferably is, increased by recycling some hot regenerated catalyst thereto via line 101 and control valve 103. If temperatures in the coke combustor are too high, some heat can be removed via catalyst cooler 48, shown as tubes immersed in the fast fluidized bed in the coke combustor. Very efficient heat transfer can be achieved in the fast fluidized bed, so it may be in some instances beneficial to both heat the coke combustor (by recycling hot catalyst to it) and to cool the coke combustor (by using catalyst cooler 48) at the same time.

In coke combustor 62 the combustion air, regardless of whether added via line 66 or 160, fluidizes the catalyst in bed 76, and subsequently transports the catalyst continuously as a dilute phase through the regenerator riser 83. The dilute phase passes upwardly through the riser 83, through riser outlet 306. Catalyst is discharged down and forms a second relatively dense bed of catalyst 81 in the regenerator 80. Catalyst preferably is discharged so as not to stir up too much the top of the dense bed, region 92.

Although down discharging side arms 306 are shown in the drawing, it is also possible, and will be preferred when space and capital permit, to have the dilute phase transport riser discharge into cyclone separators, and preferably to have a closed cyclone system in the regenerator. The present invention works well regardless of the way catalyst and flue gas discharged from the transport riser are separated. Slots can simply be cut in the side of a capped transport riser, and the simple slots will allow a dilute phase to exit and the laws of physics will eventually separate the catalyst from flue gas.

Flue gas is removed from the regenerator by passage through one or more, and most typically two stages of cyclone separation. Flue gas enters primary cyclone 308 via inlet 306. Flue gas, with a greatly reduced solids content is discharged via line 322 and passes through the second stage cyclone 86. Flue gas is discharged via exhaust line 88 into third-stage cyclone 92. Exhaust gas is removed via outlet 94 and line 100.

The hot, regenerated catalyst discharged from the various cyclones forms the bed 81, which is substantially hotter than any other place in the regenerator, and hotter than the stripping zone 30. Bed 81 is at least 55° C. (100° F.) hotter than stripping zone 31, and preferably at least 83° C. (150° F.) hotter. The regenerator temperature preferably is, at most, 871° C. (1600° F.) to prevent severely deactivating the catalyst.

In the prior art high efficiency regenerators, the catalyst was completely regenerated by the time it reached the second dense bed. Some fluffing gas, usually air, was added to aerate the bed, so regenerated catalyst could be easily withdrawn for cracking purposes, or for recycle to the coke combustor, but it was not significantly regenerated in second dense bed 81. In the process of the present invention, not only is more air added to the second dense bed, but some spent catalyst as well is added to the second dense bed.

Spent catalyst is transferred or diverted from riser mixer 60 by gravity flow in line 258. This diverted spent catalyst is added directly to the second dense bed via a transfer line 260 with some combustion air added via line 266. Spent catalyst, with perhaps some of its coke content removed, is discharged via outlet 262 generally toward second dense bed interface 82. Enough air should be added to permit transport of the spent catalyst, but preferably more air than this is added so that a significant amount of the soft coke, or hydrogen rich coke, is removed in the transfer line, at relatively mild conditions.

Although a relatively simple outlet 262, consisting merely of a downwardly facing piece of pipe, will work satisfactorily, it will usually be preferred to bring about a significant amount of catalyst/flue gas separation.

Preferred separation means are shown in FIG. 2.

Figure 2A:
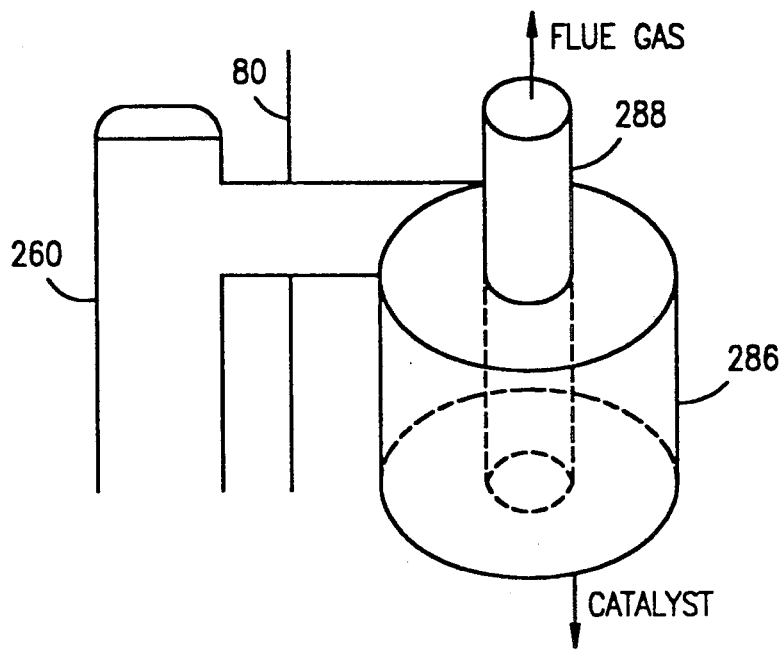
FIG. 2 shows details of three preferred catalyst/flue gas separation means.

FIG. 2A show how a cyclone separation means 286 can be used to achieve a very high degree of separation, 90 + %, of catalyst and flue gas, with relatively low pressure drop. A catalyst rich stream is discharged down from cyclone 286 while a flue gas stream with a reduced catalyst and fines content is withdrawn via outlet 288. The cyclone functions conventionally, flue gas and catalyst enter the cyclone and swirl around outlet tube 288. Centrifugal force tends to throw the catalyst to the outer walls of cyclone 286, while a catalyst deficient flue gas is removed via outlet tube 288. The bottom of the cyclone may be sealed conventionally, as with diplegs, etc., or left open as shown in the figure to reduce pressure drop, and efficiency. Most of the gas leaves via outlet 288 because the outlet pipe is much shorter than the path the gas would follow to exit via the base of the cyclone, and because the net flow of gas is up, to an outlet or cyclone in the upper regions of this vessel.

Figure 2B:
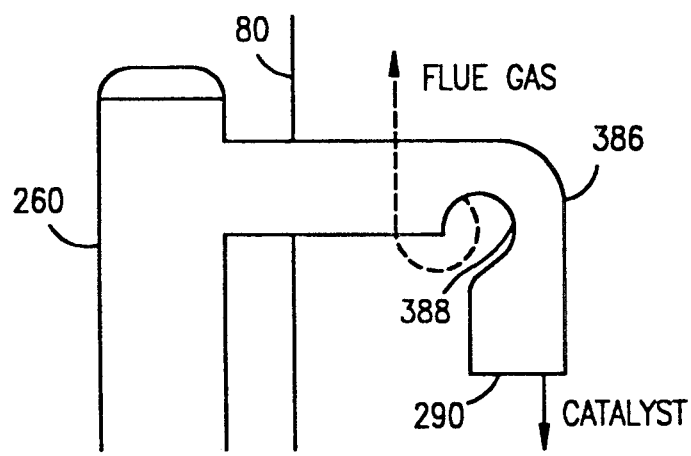
Figure 2D:
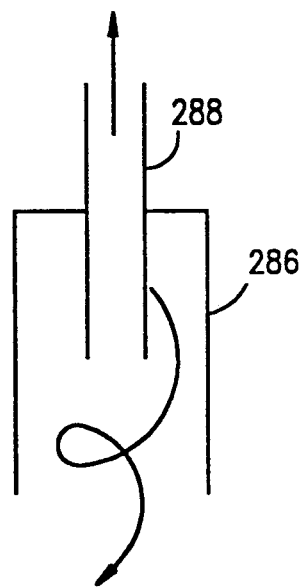

FIG. 2B shows another inertial based separator 386 in which flue gas and catalyst from transport riser 260 are discharged into downwardly extending sidearm separator 386. Inertial forces throw most of the catalyst to the far sidewall of separator 386, to be discharged down the outlet 290 of the sidearm. Most of the flue gas "short circuits" the separator by leaving via outlet 388. This type of inertial separator has been used in FCC riser reactors to provide a rough cut separation of catalyst from cracked products, and those skilled in the FCC arts can readily adapt the device for use in a FCC regenerator.

Figure 2C:
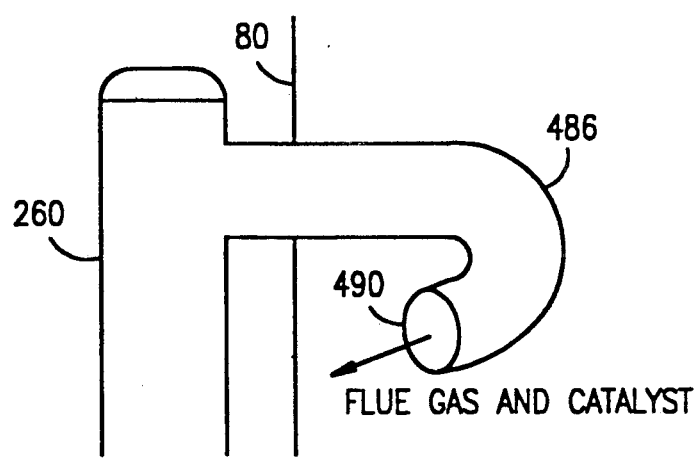

FIG. 2C shows yet another type of inertial separator 486 consisting essentially of a curved length of pipe with outlet 490. Catalyst is thrown to the far wall of separator 486, then the partially separated catalyst/flue gas mixture discharged do and toward the side of the regenerator vessel. The bulk of the catalyst will be in a lower portion of outlet 490, due to inertial separation, while the gas will flow more uniformly out of outlet 490. The tangential discharge of catalyst allows it to fall down, while the gas will flow up, to the regenerator cyclone inlets.

Separation efficiencies ranging from 90 to 99 + % are easily achievable with the inertial separators of FIGS. 2A, 2B and 2C. This degree of separation effectively eliminates any extra catalyst traffic in the dilute phase regions above bed 81. By this is meant that the catalyst traffic above bed 81 will primarily be determined by the superficial vapor velocity of gas passing through the fluidized bed, and will be affected little, or not at all, by the amount of catalyst added via transfer line 260.

The 90 + % separation efficiencies of these intertial separators is not close to the separation efficiencies needed by conventional outlet cyclones. The lower efficiency, and much lower pressure drop and greatly reduced construction cost, are possible because the cleanup of regenerator flue gas can be left to the conventional regenerator cyclones 86 and 308.

Air is preferably also added via line 78, and air flow control means not shown, to dense bed 81. Dense bed 81 preferably contains significantly more catalyst inventory than has previously been used in high efficiency regenerators. Adding inventory and adding combustion air to second dense bed 81 can also be used to shift some of the coke combustion from the coke combustor to the relatively dry atmosphere of dense bed 81, by discharging from the dilute phase transport riser catalyst with a significant amount of coke. Although this can be done, i.e. not regenerating completely the catalyst added to the coke combustor by the time it exits the dilute phase transport riser, it is not the preferred way of practicing the present invention. Preferably, all catalyst added to the coke combustor is fairly well regenerated by the time it exits the dilute phase transport riser, as in classical operation of such high efficiency regenerators.

A significant amount of either coke removal, or direct contact heat exchange of spent catalyst, or both, in the second dense bed of the regenerator is essential for the effective practice of the present invention. Direct contact heat exchange, and burning coke from spent catalyst in the second dense bed are both unusual uses of the second dense bed of hot, regenerated catalyst created by high efficiency regenerators. Both catalyst regeneration in the second dense bed, and heat exchange in the second dense bed will be briefly reviewed.

These second dense beds 81 are bubbling fluidized beds, which are not especially efficient at contacting spent catalyst with regeneration gas. The second dense bed 81 is usually very hot, and very dry, so efficient regeneration of spent catalyst, with somewhat reduced steaming of catalyst, can be achieved there. A moderate amount of backmixing occurs in such beds. Gas tends to rise through such beds at least in part in the form of relatively large bubbles.

Catalyst regeneration can be achieved in such beds, and fairly clean catalyst can be achieved as long as the second dense bed is not called on to do too much regeneration. If an attempt is made to add most of the catalyst to the second dense bed, then the coke combustor and transport riser will still work fine, but the low efficiency second dense bed will be overloaded in most high efficiency regenerators. This is because the maximum residence time that can be achieved in the second dense bed associated with most high efficiency regenerators is around 1–3 minutes, and that is simply not enough time to get the catalyst regenerated to a clean burned condition, in an inefficient dense bed.

The second dense bed of most existing high efficiency regenerators can accommodate a significant amount of spent catalyst, usually ranging from about 5 to 50% of the total amount of spent catalyst from the catalyst stripper. By this is meant that most existing high efficiency regenerators have enough "fat" in the second dense bed to achieve regeneration of this amount of catalyst with no significant changes to the second dense bed other that provision of a means to get spent catalyst directly into the second dense bed and an increase in air supply to handle the coke load. Operation with much higher levels of Pt or other CO combustion promoter will significantly increase the amount of spent catalyst that can be regenerated in the second dense bed.

With the addition of extra catalyst inventory to the second dense bed, which in many units merely means adding some more catalyst to the unit, so that more will accumulate in the second dense bed, or with the addition of extra air inlets, further increases in coke burning capacity may be achieved at minimal cost.

Heat exchange of spent catalyst in the second dense bed is highly desirable even when coke burning in the second dense bed is not desired. Although coke burning is slow, direct contact heat exchange, preferably coupled with a modest amount of heat exchange in the second dense bed, can be used to preheat the catalyst going to the coke combustor. This allows significantly more of the inventory in the coke combustor to be spent catalyst and significantly less to be recycled, hot regenerated catalyst.

FIG. 1 shows one way spent catalyst heat exchange may be achieved. By discharging spent catalyst near, or directly above, the inlet to the catalyst recycle line 101 a significant amount of heating of spent catalyst may be achieved, and this preheated spent catalyst recycled via line 101 to the coke combustor. Direct contact heat exchange in a bubbling fluid feed proceeds fairly quickly and efficiently, even though coke combustion does not. This means that for spent catalyst dumped into a bubbling fluidized bed, even though there is not enough residence time for all or much of the coke to be removed from spent catalyst, the spent catalyst can still be significantly heated in the second dense bed.

Operating in heat exchange mode means that the residence time of the spent catalyst in the coke combustor can be increased. In an extreme case, where operation of a the present invention, with a 50:50 mix of preheated-spent:spent is compared to a prior art operation, with a 50:50 mix of spent:regenerated catalyst, the present invention doubles the residence time of spent catalyst in the coke combustor, and roughly doubles the coke burning capacity of the coke combustor. The present invention permits the same temperature to be achieved in the coke combustor as in the prior art coke combustors, but with a catalyst inventory containing far more spent catalyst, and much less diluent (recycled hot, regenerated catalyst) than could be achieved in the prior art designs.

Somewhat reduced hydrothermal degradation can also be achieved using the present invention for heat exchange in the second dense bed. Spent catalyst added to the second dense bed sees a relatively dry, though high temperature environment. Soft coke, or hydrogen rich coke, will be quickly removed in such conditions, but will not create the high steam partial pressures when the embodiment shown in the drawing is used, as most of the steam precursors will be removed from the catalyst before it enters the second dense bed. Even if significant steam precursors remain, they can be effectively removed from the second dense bed in much less time than the coke can be removed. The spent catalyst will have such a short residence time in the second dense bed that little steaming of the catalyst will occur there, although significant hydrogen removal will occur. When this heated, de-hydrogenated spent catalyst is added to the coke combustor, it will not contribute as much water of combustion as the spent catalyst from the stripper, so the steam partial pressure in the coke combustor will be reduced as compared to the prior art high efficiency regenerator.

The catalyst in the second dense bed 81 will be the hottest catalyst, and will be preferred for use as a source of hot, regenerated catalyst for heating or cracking. Preferably, some hot regenerated catalyst is withdrawn from dense bed 81 and passed via line 106 and a slide valve into dense bed of catalyst 31 in stripper 30. Hot regenerated catalyst passes through line 102 and catalyst flow control valve 104 for use in heating and cracking of fresh feed.

Although not shown, flue gas analyzers such as a CO analyzer controller in the dilute phase region above second dense bed 81 can be used to maintain either complete or partial CO combustion in either the coke combustor or the second dense bed.

Although not shown, cyclones preferably are used to separate catalyst from flue gas exiting the transport riser, and isolate flue gas from regenerated catalyst. This permits isolation of steam laden flue gas from the coke combustor from the dilute phase atmosphere above the second dense bed, but requires modifying the unit. When cyclones are used, a delta Temperature, or dT controller may be used to indicate afterburning and for control of air addition to the coke combustor or the second dense bed.

When an extremely heavy, or high coking feed is processed, the regenerator will be pushed to its limits. Cooling coils in the coke combustor, or in the second dense bed, will likely be needed to keep temperatures within tolerable limits.

I prefer to operate both the dilute phase transport riser, and the second dense bed in substantially complete CO combustion mode. It is possible to operate either or both in partial CO combustion mode, but for most units complete CO combustion will be preferred.

OTHER EMBODIMENTS

A number of mechanical modifications may be made to the high efficiency regenerator without departing from the scope of the present invention. As an example, the riser mixer 60 may discharge into a cyclone or other separation means contained within the coke combustor. The resulting flue gas may be separately withdrawn from the unit, without entering the dilute phase transport riser. Such a regenerator configuration is shown in EP A 0259115, published on Mar. 9, 1988 and in U.S. application Ser. No. 188,810 now U.S. Pat. No. 4,868,140 which is incorporated herein by reference.

Now that the invention has been reviewed in connection with the embodiment shown in the Figure, a more detailed discussion of the different parts of the process and apparatus of the present invention follows. Many elements of the present invention can be conventional, such as the cracking catalyst, or are readily available from vendors, so only a limited discussion of such elements is necessary.

FCC FEED

Any conventional FCC feed can be used. The feeds may range from the typical, such as petroleum distillates or residual stocks, either virgin or partially refined, to the atypical, such as coal oils and shale oils. The feed frequently will contain recycled hydrocarbons, such as light and heavy cycle oils which have already been subjected to cracking.

Preferred feeds are gas oils, vacuum gas oils, atmospheric resids, and vacuum resids. The present invention is most useful with feeds having an initial boiling point above about 650° F.

FCC CATALYST

Any commercially available FCC catalyst may be used. The catalyst can be 100% amorphous, but preferably includes some zeolite in a porous refractory matrix such as silica-alumina, clay, or the like. The zeolite is usually 5-40 wt. % of the catalyst, with the rest being matrix. Conventional zeolites include X and Y zeolites, with ultra stable, or relatively high silica Y zeolites being preferred. Dealuminized Y (DEAL Y) and ultrahydrophobic Y (UHP Y) zeolites may be used. The zeolites may be stabilized with Rare Earths, e.g., 0.1 to 10 Wt % RE.

Relatively high silica zeolite containing catalysts are preferred for use in the present invention. They withstand the high temperatures usually associated with complete combustion of CO to $CO_2$ within the FCC regenerator.

The catalyst inventory may also contain one or more additives, either present as separate additive particles or mixed in with each particle of the cracking catalyst. Additives can be added to enhance octane (shape selective zeolites, i.e., those having a Constraint Index of 1-12, and typified by ZSM-5, and other materials having a similar crystal structure), adsorb SOX (alumina), remove Ni and V (Mg and Ca oxides).

Good additives for removal of SOx are available from several catalyst suppliers, such as Davison's "R" or Katalistiks International, Inc.'s "DeSox."

CO combustion additives are available from most FCC catalyst vendors.

The FCC catalyst composition, per se, forms no part of the present invention.

FCC REACTOR CONDITIONS

Conventional FCC reactor conditions may be used. The reactor may be either a riser cracking unit or dense bed unit or both. Riser cracking is highly preferred. Typical riser cracking reaction conditions include catalyst/oil ratios of 0.5:1 to 15:1 and preferably 3:1 to 8:1, and a catalyst contact time of 0.3-50 seconds, and preferably 0.5-20 seconds.

It is preferred, but not essential, to use an atomizing feed mixing nozzle in the base of the riser reactor, such as ones available from Bete Fog. Supersonic nozzles, nozzles used to make snow in ski areas, orifice pipe nozzles, etc may be used. Nozzles which are efficient atomizers require more oil pressure drop, more atomizing steam, and cost more. Simpler nozzles, e.g., orifice or spiral tip, are used by most refiners.

It is preferred, but not essential, to have a riser acceleration zone in the base of the riser.

It is preferred, but not essential, to have the riser reactor discharge into a closed cyclone system for rapid and efficient separation of cracked products from spent catalyst. preferred closed cyclone system is disclosed in U.S. Pat. No. 4,502,947 to Haddad et al.

It is preferred but not essential, to rapidly strip the catalyst, immediately after it exits the riser, and upstream of the conventional catalyst stripper. Stripper cyclones disclosed in U.S. Pat. No. 4,173,527, Schatz and Heffley, may be used.

It is preferred, but not essential, to use a hot catalyst stripper. Hot strippers heat spent catalyst by adding some hot, regenerated catalyst to spent catalyst. A good hot stripper design is shown in U.S. Pat. No. 4,820,404 Owen, which is incorporated herein by reference. A catalyst cooler cools the heated catalyst before it is sent to the catalyst regenerator.

The FCC reactor and stripper conditions, per se, can be conventional and form no part of the present invention.

CATALYST REGENERATION

The process and apparatus of the present invention can use many conventional elements most of which are conventional in FCC regenerators.

The present invention uses as its starting point a high efficiency regenerator such as is shown in the Figures. or as shown. The essential elements include a coke combustor, a dilute phase transport riser and a second dense bed. Preferably, a riser mixer is used. These elements are generally known.

A means must be provided for direct addition of spent catalyst into the second dense bed of a high efficiency regenerator. Preferably, a means is provided to significantly increase the catalyst inventory in the second dense bed of the regenerator, and to add a significant amount of combustion air for coke combustion in the second dense bed.

Each part of the regenerator will be briefly reviewed below, starting with the riser mixer and ending with the regenerator flue gas cyclones.

Some of the spent catalyst and some combustion air are charged to the riser mixer 60. Some regenerated catalyst, recycled through the catalyst stripper, will usually be mixed in with the spent catalyst. Some regenerated catalyst may also be directly recycled to the base of the riser mixer 60, either directly or, preferably, after passing through a catalyst cooler. Riser mixer 60 is a preferred, but not essential, way to get the regeneration started. The riser mixer typically burns most of the fast coke (probably representing entrained or adsorbed hydrocarbons) and a very small amount of the hard coke. The residence time in the riser mixer is usually very short. The amount of hydrogen and carbon removed, and the reaction conditions needed to achieve this removal are reported below.

| RISER MIXER CONDITIONS | | | |
|---|---|---|---|
| | Good | Preferred | Best |
| Inlet Temp. °F. | 900-1200 | 925-1100 | 950-1050 |
| Temp. Increase, °F. | 10-200 | 25-150 | 50-100 |
| Catalyst Residence Time, Seconds | 0.5-30 | 1-25 | 1.5-20 |
| Vapor velocity, fps | 5-100 | 7-50 | 10-25 |
| % total air added | 1-25 | 2-20 | 3-15 |
| H2 Removal, % | 10-50 | 12-45 | 15-40 |
| Carbon Removal, % | 1-20 | 2-15 | 3-10 |

Although operation with a riser mixer is preferred, it is not essential, and in many units is difficult to implement because there is not enough elevation under the coke combustor in which to fit a riser mixer. Spent, stripped catalyst may be added directly to the coke combustor.

Riser mixer 260, used to get spent catalyst into the second dense bed, may operate at the same conditions as riser mixer 60 used to get catalyst into the coke combustor. Riser mixer 260 is preferred, but not essential. Spent catalyst may be added to the second dense bed by any means, ranging from a bucket conveyor to dilute phase transport as shown in the figure. Preferred conditions in riser mixer 260 correspond to those used in riser mixer 60.

The coke combustor 62 contains a fast fluidized dense bed of catalyst. It is characterized by relatively high superficial vapor velocity, vigorous fluidization, and a relatively low density dense phase fluidized bed. Most of the coke on spent catalyst added to the coke combustor is usually burned in the coke combustor. The coke combustor efficiently burns "fast coke", primarily unstripped hydrocarbons, on spent catalyst. When a riser mixer is used, a large portion, perhaps most, of the "fast coke" will be removed upstream of the coke combustor. If no riser mixer is used, the relatively easy job of burning the fast coke will be done in the coke combustor.

The removal of hydrogen and carbon achieved in the coke combustor alone (when no riser mixer is used) or in the combination of the coke combustor and riser mixer, is presented below. The operation of the riser mixer and coke combustor can be combined in this wy, because what is important is that catalyst leaving the coke combustor have specified amounts of carbon and hydrogen removed.

The conditions recited below refer to conditions in the coke combustor 62.

| COKE COMBUSTOR CONDITIONS | | | |
|---|---|---|---|
| | Good | Preferred | Best |
| Dense Bed Temp. °F. | 950-1300 | 1000-1275 | 1050-1250 |
| Catalyst Residence Time, Seconds | 10-500 | 20-240 | 30-180 |
| Vapor velocity, fps | 1-40 | 2-20 | 3.5-10 |
| % total air added | 40-100 | 50-98 | 60-95 |
| H2 Removal, % | 50-100 | 60-98 | 70-95 |
| Carbon Removal, % | 40-100 | 50-95 | 60-90 |

The dilute phase transport riser 83 forms a dilute phase where efficient "cleanup" afterburning of CO to $CO_2$ preferably occurs.

Additional air can be added to the dilute phase transport riser, but usually it is better to add the air lower down in the regenerator, and speed up coke burning rates some.

It will be beneficial, in most units, to achieve complete afterburning of CO to $CO_2$ in the transport riser 83. Usually this will require temperatures of 1200°-1300° F. or higher in the base of the riser, or exiting the coke combustor, and/or the presence of sufficient CO combustion promotor to burn most of the CO to $CO_2$ in the few second of gas residence time in the riser.

| TRANSPORT RISER 83 CONDITIONS | | | |
|---|---|---|---|
| | Good | Preferred | Best |
| Inlet Temp. °F. | 900-1300 | 925-1275 | 950-1250 |
| Outlet Temp. °F. | 925-1450 | 975-1400 | 1000-1300 |
| Catalyst Residence Time, Seconds | 1-60 | 2-30 | 3-10 |
| Vapor velocity, fps | 6-100 | 10-40 | 15-30 |
| % additional air in | 0-50 | 0-10 | 0-5 |
| H2 Removal, % | 0-15 | 1-10 | 2-5 |
| Carbon Removal, % | 0-10 | 1-8 | 2-5 |

Quick and effective separation of catalyst from flue gas exiting the dilute phase transport riser is not essential but is very beneficial for the process. The quick separation of catalyst and flue gas sought in the regenerator transport riser outlet is very similar to the quick separation of catalyst and cracked products sought in the riser reactor outlet.

The most preferred separation system is discharge of the regenerator transport riser dilute phase into a closed cyclone system such as that disclosed in U.S. Pat. No. 4,502,947.

Other methods of effecting a rapid separation of catalyst from steam laden flue gas may also be used, but most of these will not work as well as the use of closed cyclones. Acceptable separation means include a capped riser outlet discharging catalyst down through an annular space defined by the riser top and a covering cap.

In a preferred embodiment, the transport riser outlet may be capped with radial arms, not shown, which direct the bulk of the catalyst into large diplegs leading down into the second dense bed of catalyst in the regenerator. Such a regenerator riser outlet is disclosed in U.S. Pat. No. 4,810,360, which is incorporated herein by reference.

At least 90% of the catalyst discharged from the transport riser preferably is quickly discharged into the second dense bed, discussed below.

In prior art second dense beds, the catalyst was merely collected and recycled (to the reactor and frequently to the coke combustor). Catalyst temperatures were typically 1250°-1350° F., with some operating slightly hotter, perhaps approaching 1400° F. The average residence time of catalyst was usually 60 seconds or less. A small amount of air, typically around 1 or 2% of the total air added to the regenerator, was added to the dense bed to keep it fluffed and enable it to flow into collectors for recycle to the reactor. The superficial gas velocity in the bed was typically less than 0.5 fps, usually 0.05-0.1 fps. The bed was relatively dense, bordering on incipient fluidization. This was efficient use of the second dense bed as a catalyst collector, but meant that little or no regeneration of catalyst was achieved in the second dense bed. Because of the low vapor velocity in the bed, very poor use would be made of even the small amounts of oxygen added to the bed. Large fluidized beds such as this are characterized, or plagued, by generally poor fluidization, and relatively large gas bubbles.

In the process of the invention, the second fluidized bed does much more work towards regenerating the catalyst. The step is to provide the second dense bed with some spent catalyst to regenerate. Preferably from 5 to 50% of the spent catalyst is added directly to the second dense bed, without passing through the coke combustor.

Preferably, the second dense bed is modified if necessary so that substantially more catalyst residence time is achieved in the second dense bed. At least 1 minute, and preferably a much longer residence time is achieved in the second dense bed. This increased residence time can be achieved by adding more catalyst to the unit, and letting it accumulate in the second dense bed.

Much more air is preferably added to the dense bed, for several reasons. First, quite a lot of carbon burning can be achieved in the second dense bed, so the air is needed for combustion. Second, more air improves the fluidization in the second dense bed. Improved fluidization improved coke combustion, and improved direct contact heat exchange. It is possible to retain the old fluffing or fluidization rings customarily used in such units, and add an additional air distributor or air ring alongside of, or above, the old fluffing ring.

| SECOND DENSE BED CONDITIONS | | | |
|---|---|---|---|
| | Good | Preferred | Best |
| Temperature °F. | 1200-1600 | 1250-1500 | 1300-1400 |
| Catalyst Residence Time, Seconds | 30-500 | 45-200 | 60-180 |
| Vapor velocity, fps | 0.5-5 | 1-4 | 1.5-3.5 |
| % total air added | 0-90 | 2-60 | 5-40 |
| H2 Removal, % | 0-15 | 0.1-5 | 0.2-2 |
| Carbon Removal, % | 0-60 | 2-50 | 5-40 |

CO COMBUSTION PROMOTER

Use of a CO combustion promoter in the regenerator or combustion zone is not essential for the practice of the present invention, however, it is preferred. These materials are well-known.

U.S. Pat. No. 4,072,600 and U.S. Pat. No. 4,235,754, which are incorporated by reference, disclose operation of an FCC regenerator with minute quantities of a CO combustion promoter. From 0.01 to 100 ppm Pt metal or enough other metal to give the same CO oxidation, may be used with good results. Very good results are obtained with as little as 0.1 to 10 wt. ppm platinum present on the catalyst in the unit. Pt can be replaced by other metals, but usually more metal is then required. An amount of promoter which would give a CO oxidation activity equal to 0.3 to 3 wt. ppm of platinum is preferred.

Conventionally, refiners add CO combustion promoter to promote total or partial combustion of CO to $CO_2$ within the FCC regenerator. More CO combustion promoter can be added without undue bad effect—the primary one being the waste of adding more CO combustion promoter than is needed to burn all the CO.

The present invention can operate with extremely small levels of CO combustion promoter while still achieving relatively complete CO combustion because the heavy, resid feed will usually deposit large amounts of coke on the catalyst, and give extremely high regenerator temperatures. The high efficiency regenerator design is especially good at achieving complete CO combustion in the dilute phase transport riser, even without any CO combustion promoter present, provided sufficient hot, regenerated catalyst is recycled from the second dense bed to the coke combustor. Catalyst recycle to the coke combustor promotes the high temperatures needed for rapid coke combustion in the coke combustor and for dilute phase CO combustion in the dilute phase transport riser.

Usually it will be preferred to operate with much higher levels of CO combustion promoter because use of the second dense bed as a primary means of burning coke could lead to production of large amounts of CO in the dilute phase above the second dense bed. Operation with large amounts of CO combustion promoter will reduce CO emissions from the second dense bed even when only partial coke combustion is achieved in the second dense bed.

ILLUSTRATIVE EMBODIMENT

The effect of the process of the present invention can best be seen by considering an otherwise conventional FCC unit with a high efficiency regenerator, operating with 20% of the spent catalyst charged directly to the second dense bed, and bypassing the coke combustor.

The process can be conducted using a 343° to 593° C. (650° to 1100° F.) boiling range feed charged to riser reactor 4 to mix hot (about 760° C. (1400° F.) regenerated catalyst and form a catalyst-hydrocarbon mixture. The mixture passes up through riser 4 into effluent conduit 6. The riser top temperature is about 538° C. (1000° F.). Spent catalyst discharged via cyclone diplegs collects a bed of catalyst 31. The hot stripping zone 30 operates at about 1050°-1150° F. Regenerated catalyst, added at a temperature of 1300°-1400° F., heats the stripping zone.

80% of the well stripped catalyst, at a temperature of about 621° C. (1150° F.), combines with air from line 66 in riser mixer 60 to form an air-catalyst mixture. The mixture rises into the coke combustor fast fluid bed 76. Enough hot regenerated catalyst is added to the coke combustor, usually roughly equal to the amount of spent catalyst added to the coke combustor, to get the coke combustor hot enough for efficient carbon burning. The temperature of the coke combustor is usually around 1250°-1300° F., because of recycle of hot regenerated catalyst, some preheating due to combustion in the riser mixer, and coke combustion in the coke combustor.

The catalyst and combustion air/flue gas mixture elutes up from fast fluid bed 76 through the dilute phase transport riser 83 and into a regenerator vessel 80. The catalyst exiting the riser 83 is separated from steam laden flue gas. A catalyst phase passes down through the dipleg 84 to form a second dense bed 81. The catalyst is essentially 100% regenerated in passing through the coke combustor and second dense bed.

80% of the spent catalyst is transported via riser mixer 260 and discharged above the second dense bed 81. The catalyst is presumed to be added to the second dense bed far enough away from the point of recycle to the coke combustor such that none of the spent catalyst added via line 260 is recycled to the coke combustor. This is not preferred, but it illustrates the amount of coke combustion that can be performed in the second dense bed.

The process of the present invention can be readily added to existing high efficiency regenerators. Most of the regenerator can be left untouched, as the modifications to install a spent catalyst transfer means to the second dense bed requires major modification only to the outside of the regenerator. Usually only minor modifications will be needed in the second dense bed to accommodate the additional combustion air, and perhaps to add extra air rings.

The existing riser mixer 60 (if used), the coke combustor, and the dilute phase transport riser require no modification, other than perhaps a catalyst outlet from the riser mixer, or an extra line to allow some of the spent catalyst to bypass the existing riser mixer 60.

Preferably a significant amount, perhaps up to 50% of the coke combustion occurs in the dry atmosphere of the second dense bed. Temperatures in the second dense bed are high, so rapid coke combustion can be achieved even in a bubbling fluidized bed.

Use of the second fluidized bed, which will usually be a dense phase, bubbling fluidized bed, primarily for preheating and only to a limited extent for catalyst regeneration will also be beneficial. Passage through the second fluidized bed will efficiently preheat catalyst charged to the coke combustor. The worst coke, from a steaming standpoint, is the "fast coke", which will be rapidly removed in passing through the second fluidized bed. This hydrogen rich material, much of which is simply hydrocarbons left behind by poor stripping, will either be stripped or burned from the secondary catalyst. The hydrogen in the fast coke will still form water, but will do so in a region where there is not much catalyst traffic, i.e., the steam will go up, but the catalyst will flow down. This is especially true when a significant amount of coke combustion occurs in the transport pipe moving the secondary catalyst up into the second fluidized bed. Thus, if desired, a significant amount of catalyst regeneration can occur during transport of spent catalyst up the external riser 260 into the second fluidized bed. Addition of large amounts of recycled catalyst, and/or operation with large amounts of Pt in catalyst inventory, coupled with addition of more air via line 266, will permit a significant amount of regeneration to occur upstream of the second fluidized bed.

The process and apparatus of the present invention give reginers get flexibility. Existing regenerators, especially those with limited air blower capacity, can shift some of the regeneration air to the transport regenerator 260 and reduce air flow to the coke combustor. This will reduce the vapor traffic in the dilute phase region above interface 92. Use of the transport regenerator with minimal air will restrict the function of this pipe, and a brief residence time in bed 91, to a preheating role. Preheating the spent catalyst, by passage through bubbling dense bed 81 and from there via conduit 101 into the coke combustor allows for reduced amounts of catalyst recycle. Thus catalyst traffic through the coke combustor and transport riser can be reduced, in addition to vapor traffic as discussed above. This preheating is possible because bubbling dense beds have fairly good vertical mixing, but only poor circulation in horizontal directions. If 10 tons per minute of spent catalyst are discharged via outlet 260 into bubbling dense bed 81, and a total of 15 or 10 tons a minute of catalyst withdrawn from bed 81 from an outlet beneath outlet 262, well over 90% of the discharged spent catalyst will pass through outlet 101 into the coke combustor.

I claim:

1. A fluidized catalytic cracking process for catalytic cracking of a heavy hydrocarbon feed comprising hydrocarbons having a boiling point above about 650° F. to lighter products by contact of the heavy feed with a source of hot, regenerated catalytic cracking catalyst to produce cracked products and spent catalyst containing coke, and wherein the spent catalyst is stripped, and the stripped, spent catalyst is regenerated by contact with oxygen or an oxygen containing gas at catalyst regeneration conditions in a high efficiency regenerator comprising a coke combustor having a dense bed of catalyst, a dilute phase transport riser mounted above the coke combustor, and a second fluidized bed of regenerated catalyst, and wherein the stripped catalyst is split into a first and second stream, the first stream is charged to the coke combustor and the second stream is charged directly to the second fluidized bed without passage through the coke combustor or dilute phase transport riser.

2. The process of claim 1 wherein the second stream comprises from 5 to 50% of the stripped catalyst.

3. The process of claim 1 wherein the second stream comprises from 7.5 to 35% of the stripped catalyst.

4. The process of claim 1 wherein the first steam of catalyst is charged to the coke combustor via a transport riser beneath the coke combustor and the second stream of stripped is charged into the second fluidized bed the via a transport riser.

5. The process of claim 1 wherein the second stream of stripped catalyst is regenerated in the second fluidized bed to a coke content of less than about 0.1 wt % by addition of oxygen or an oxygen containing gas to the second fluidized bed.

6. The process of claim 1 where the second stream of stripped catalyst is heated in the second fluidized bed by direct contact heat exchange with the catalyst in the second fluidized bed, and the heated, stripped catalyst in the second stream is charged at least in part to the coke combustor.

7. The process of claim 1 wherein the catalyst comprises about 0.1 to 10 wt ppm Pt or other CO combustion promoter having an equivalent CO oxidation activity and the catalytic cracking zone comprises a riser reactor.

8. A fluidized catalytic cracking process wherein a heavy hydrocarbon feed comprising hydrocarbons having a boiling point above about 650° F. is catalytically cracked to lighter products comprising:
   a. catalytically cracking the feed in a catalytic cracking zone operating at catalytic cracking conditions by contacting the feed with a source of hot regenerated catalyst to produce a cracking zone effluent mixture having an effluent temperature and comprising cracked products and spent cracking catalyst containing coke comprising carbon, hydrogen and strippable hydrocarbons;
   b. separating the cracking zone effluent mixture into a cracked product rich vapor phase and a solids rich phase having a temperature and comprising the spent catalyst and strippable hydrocarbons;
   c. stripping the spent catalyst with a stripping gas to remove strippable and produce stripped catalyst;
   d. separating the stripped catalyst into at least two streams comprising a primary stripped catalyst stream comprising at least a majority of the stripped catalyst and a secondary stripped catalyst stream;
   e. regenerating the primary stripped catalyst stream by contact with oxygen or an oxygen containing gas at catalyst regeneration conditions in a high efficiency catalyst regeneration means comprising, in series, a fast fluidized bed coke combustor, a superimposed dilute phase transport riser, and a second fluidized bed at an elevation above said coke combustor;
   f. regenerating the secondary stripped catalyst stream by charging it to the base of a vertical lift pipe, at least a portion of which is parallel to but isolated from said transport riser, and adding a lift fluidizing medium comprising oxygen or an oxygen containing gas to the base of the lift pipe and lifting said secondary stripped catalyst directly to the second fluidized bed via said lift pipe;
   g. recycling to the catalytic cracking process hot regenerated catalyst from said second fluidized bed.

9. The process of claim 8 wherein the secondary stripped catalyst is heated in the second fluidized bed by direct contact heat exchange with catalyst in the second fluidized bed to produce heated secondary catalyst, and wherein at least a portion of the heated secondary catalyst is charged to the coke combustor from the second fluidized bed.

10. The process of claim 8 wherein the secondary stripped catalyst is regenerated in the second fluidized bed by addition of oxygen or oxygen containing gas to the second fluidized bed in an amount equal to that required by stoichiometry for coke combustion therein.

11. The process of claim 8 wherein the secondary catalyst stream is from 5 to 50% of the stripped catalyst.

12. The process of claim 8 wherein the secondary catalyst stream is from 7.5 to 35% of the stripped catalyst.

13. The process of claim 8 wherein the primary and secondary streams of stripped catalyst are heated by direct contact heat exchange with hot regenerated catalyst from the second fluidized bed.

14. The process of claim 8 wherein the spent catalyst with strippable hydrocarbons is heated by direct contact heat exchange with hot regenerated catalyst from the second fluidized bed to produce heated spent catalyst, which is stripped to produce hot stripped catalyst, and said resulting hot stripped catalyst is split into primary and secondary streams of stripped catalyst.

15. The process of claim 8 wherein the catalyst comprises about 0.1 to 10 wt ppm Pt or other CO combustion promoter having an equivalent CO oxidation activity.

16. The process of claim 8 wherein the catalytic cracking zone comprises a riser reactor.

17. An apparatus for the fluidized catalytic cracking of a heavy hydrocarbon feed comprising hydrocarbons having a boiling point above about 650° F. to lighter products by contact said feed with catalytic cracking catalyst comprising:
   a. a catalytic cracking reactor means having an inlet connective with a source of said feed and with a source of hot regenerated catalyst and having an outlet for discharging a cracking zone effluent mixture comprising cracked products and spent cracking catalyst containing coke and strippable hydrocarbons;
   b. a separation means connective with said reactor outlet for separating said cracking zone effluent mixture into a cracked product rich vapor phase and a solids rich phase comprising said spent catalyst and strippable hydrocarbons;
   c. a stripping means comprising an inlet for spent catalyst, an inlet for a stripping gas, a stripping vapor outlet and a solids outlet for discharge of stripped solids
   d. a stripped catalyst stream splitting means adapted to divide the stripped catalyst into a primary stream comprising a majority of the stripped catalyst and a secondary stream;
   e. a high efficiency catalyst regeneration means connective with the primary stream of stripped catalyst from the stream splitting means and comprising, in series, a coke combustor in a first vessel having an elevation, a vertical dilute phase transport riser, and a second fluidized bed in a second vessel at an elevation above said first vessel, and wherein
   said coke combustor means is adapted to maintain a fast fluidized bed of catalyst therein at fast fluidized bed catalyst regeneration conditions, and has an inlet for the primary stream of stripped catalyst, a primary regeneration gas inlet, an upper coke combustor outlet for discharge of at least partially regenerated catalyst and flue gas, said upper outlet being connective with and in vertical alignment with a dilute phase transport riser;
   said dilute phase transport riser means has an inlet at a base thereof connective with said upper outlet of said coke combustor and a transport riser outlet at an upper portion of said transport riser and within the second vessel; and
   said second vessel means has an inlet comprising said transport riser outlet, and said second vessel is adapted to contain at least the upper portion of said transport riser and to contain and maintain the second fluidized phase fluidized bed of catalyst in a lower portion of said second stage regeneration vessel;
   f. a secondary stripped catalyst stream transport means having an inlet connective with said stripped catalyst splitting means, an inlet for a lift gas, a vertical lift pipe, at least a portion of which is parallel to but isolated from said dilute phase transport riser, and a lift pipe outlet within said second vessel; and
   g. a catalyst recycle means connective with a portion of said second fluidized bed in said second vessel and adapted to recycle regenerated catalyst to said cracking reactor means.

18. The apparatus of claim 17 comprising a catalyst recycle means connective with a portion of said second fluidized bed in said second vessel and adapted to recycle regenerated catalyst to said catalyst stripping means.

19. The apparatus of claim 17 comprising a catalyst recycle means connective with a portion of said second fluidized bed in said second vessel and adapted to recycle regenerated catalyst to said coke combustor means.

20. The apparatus of claim 17 wherein the second vessel of the high efficiency regenerator comprises an secondary catalyst inlet for said secondary catalyst connective with an upper portion of said second fluidized bed and a secondary catalyst outlet in a lower portion of said second fluidized bed in open fluid communication with inlet and spaced therefrom an amount to permit direct contact heat exchange of said secondary catalyst stream with catalyst in said second fluidized bed, and wherein said catalyst secondary catalyst outlet is connective with an inlet of said coke combustor.

* * * * *